United States Patent [19]
Osada et al.

[11] Patent Number: 5,783,220
[45] Date of Patent: Jul. 21, 1998

[54] RESIN SEALING AND MOLDING APPARATUS FOR SEALING ELECTRONIC PARTS

[75] Inventors: Michio Osada; Keiji Maeda, both of Kyoto, Japan

[73] Assignee: Towa Corporation, Uji, Japan

[21] Appl. No.: 738,095

[22] Filed: Oct. 25, 1996

[30] Foreign Application Priority Data

Oct. 30, 1995 [JP] Japan .................. 7-306911

[51] Int. Cl.$^6$ .................. B29C 45/14; B29C 45/17
[52] U.S. Cl. .................. 425/116; 425/117; 425/225; 425/227; 425/229; 425/174.4; 264/39
[58] Field of Search .................. 425/225, 229, 425/227, 228, 174.4, 210, 116, 117, DIG. 228; 264/39, 272.17

[56] References Cited

U.S. PATENT DOCUMENTS

| | | | |
|---|---|---|---|
| 3,690,801 | 9/1972 | Hutz et al. | 425/229 |
| 3,801,251 | 4/1974 | Coscia | 425/229 |
| 3,941,537 | 3/1976 | Abraham | 425/229 |
| 4,983,115 | 1/1991 | Yamasaki et al. | 425/229 |

FOREIGN PATENT DOCUMENTS

| | | | |
|---|---|---|---|
| 59-220931 | 12/1984 | Japan | 425/225 |
| 61-31219 | 2/1986 | Japan | 425/229 |
| 61-293814 | 12/1986 | Japan | 425/229 |
| 63-237913 | 10/1988 | Japan | 425/229 |
| 4-158007 | 6/1992 | Japan | 425/225 |

Primary Examiner—Khanh P. Nguyen
Attorney, Agent, or Firm—W. F. Fasse; W. G. Fasse

[57] ABSTRACT

A resin sealing and molding apparatus for electronic parts includes, a cleaning UV application mechanism for removing mold surface contaminants adhering to or accumulating on the mold surfaces. The UV application mechanism is mounted to be freely reciprocative to a retracted position not inhibiting an operation for supplying unsealed lead frames and resin tablets to each resin molding unit part and an operation for taking out sealed lead frames, and to a deployed or operating position close to the mold surfaces in each resin molding unit. Using this UV application mechanism especially in conjunction with a suction device, the mold surface contaminants, such as a; mold release agent contained in a resin material or volatile gas generated by heating, that adhere to or accumulate on the mold surfaces of each resin molding unit are efficiently and reliably removed.

15 Claims, 5 Drawing Sheets

RESIN SEALING AND MOLDING APPARATUS FOR SEALING ELECTRONIC PARTS

BACKGROUND OF THE INVENTION

1 Field of the Invention

The present invention relates to an improvement of a molding apparatus for sealing and molding electronic parts such as ICs, LSIs, diodes or capacitors, which are mounted on lead frames, with a resin material.

2 Description of the Background Art

In general, electronic parts are sealed and molded with resin by transfer molding, through a resin sealing and molding apparatus generally having the following basic structure.

The resin sealing and molding apparatus comprises material loading parts for loading unshaped lead frames and resin tablets, a resin sealing and molding part (a mold for resin sealing and molding) for sealing and molding with a resin material the electronic parts mounted on the unshaped lead frames, a molding storage part for storing sealed lead frames that have been molded in the resin sealing and molding part, a material supply mechanism for transferring the unshaped lead frames and the resin tablets from the material loading parts to the resin sealing and molding part, a molding transfer mechanism for transferring the sealed lead frames molded in the resin sealing and molding part to the molding storage part, an unnecessary resin cutting and removing part for cutting and removing resin molding portions that are unnecessary in the finished products coupled with the sealed lead frames, a mold surface cleaning mechanism for removing resin flashes adhering to mold surfaces (parting line or PL surfaces) of the mold in the resin sealing and molding part, and a control mechanism for automatically controlling these parts.

With such a resin sealing and molding apparatus, electronic parts are sealed and molded with resin in the following manner, for example.

The mold (upper and lower mold sections) in the resin sealing and molding part is previously heated by heating means to a resin molding temperature, while the upper and lower mold sections are opened.

Then, the unshaped lead frames provided in the material loading part are supplied to and set in prescribed positions on the mold surface of the lower mold section, while the resin tablets are supplied into pots of the lower mold section.

Then, the lower mold section is upwardly moved to close the upper and lower mold sections. At this time, the electronic parts and the lead frames on the peripheries thereof are engaged and set in upper and lower cavities which are oppositely provided on the mold surfaces of the upper and lower mold sections, while the resin tablets are heated in the pots to be successively melted.

Then, the resin tablets in the pots are pressurized with plungers so that the melted resin material is injected or charged into the upper and lower cavities through passages provided therefor, whereby the electronic parts and the lead frames on the peripheries thereof, which have been set in the cavities, are sealed in resin moldings (mold packages) that are molded in correspondence to the shapes of the cavities.

After a lapse of a required time necessary for hardening the melted resin material, the upper and lower mold sections are opened so that the sealed lead frames, i.e., the resin moldings and the lead frames in the upper and lower cavities, and the aforementioned unnecessary resin molding portions which are coupled or integrated with the same are projected between the mold sections and released.

Then, the sealed lead frames and the unnecessary resin molding portions are transferred to the unnecessary resin molding cutting and removing part through the molding transfer mechanism simultaneously with the aforementioned releasing action, so that the unnecessary resin molding portions are cut and removed.

Then, the sealed lead frames from which the unnecessary resin molding portions are removed are transferred to and stored in the molding storage part by the molding transfer mechanism.

Further, resin flashes adhering to the mold surfaces of the mold provided in the resin sealing and molding part are removed therefrom by the mold surface cleaning mechanism every time the aforementioned molding cycle is completed.

In order to automatically seal and mold the electronic parts on the lead frames with resin, the aforementioned material loading part, resin sealing and molding part, molding storage part, material supply mechanism, molding transfer mechanism, unnecessary resin molding cutting and removing part and mold surface cleaning mechanism and the automatic control mechanism for these parts are necessary, and hence a resin sealing and molding apparatus for electronic parts generally comprises a set of the aforementioned parts and mechanisms as its basic structure.

In order to simultaneously produce the same type of produce in a large quantity or simultaneously product small quantities of different types of products, for example, with a single resin sealing and molding apparatus, and to reduce the overall molding cost, a resin sealing and molding apparatus of a novel structure and form including a resin sealing and molding apparatus body and a connector, consisting of a plurality of resin sealing and molding apparatuses comprising at least resin sealing and molding parts, which is detachably connected to the apparatus body, has been developed.

The aforementioned mold surface cleaning mechanism is integrated with the molding transfer mechanism for operating the mold surface cleaning mechanism in a step of transferring moldings by the molding transfer mechanism, thereby carrying out the molding transfer step and a mold surface cleaning step substantially at the same time.

In this resin sealing and molding apparatus, the resin sealing and molding parts which are connected to the apparatus body can be entirely or partially operated through the automatic control mechanism, whereby it is possible to advantageously achieve a mode of operating a molding apparatus which can quickly cope with a change of the type of the products or an increase or decrease of the production quantity, for example.

While the resin sealing and molding apparatus in the mode of detachably connecting the plurality of resin sealing and molding parts to the apparatus body has the aforementioned advantage, the following problems arise in view of improvement of efficiency in molding operation.

The mold surface cleaning mechanism is integrated with the molding transfer mechanism, whereby the molding transfer step and the mold surface cleaning step can advantageously be carried out substantially at the same time, as described above.

In the step of mold surface cleaning with the mold surface cleaning mechanism, forward ends of brush members are pressed against the mold surfaces and moved thereon following movement of the molding transfer mechanism, thereby separating and removing resin flashes adhering to the mold surfaces.

When the resin molding operation is performed over a long time, however, mold surface contaminants such as a mold release agent contained in the resin material and volatile gas generated by heating adhere to and accumulate on the mold surfaces of the mold and the inner surfaces of the resin loading part (molding cavities) and passages (runners and gates) for the melted resin material, for example, which ultimately causes a state called mold dulling or the like.

Such mold surface contaminants cause defective appearances or imperfect mold releasing of the moldings when the same are left intact, and hence the mold surface contaminants must be removed during every prescribed molding cycle or shot number.

However, the mold surface contaminants so strongly adhere to the mold surfaces that the same cannot be reliably removed by the aforementioned mold surface cleaning means that operate by pressing the forward ends of the brush members against the mold surfaces and moving the same.

The mold surface contaminants may conceivably be removed by detaching the mold and cleaning its mold surfaces with physical means employing sandblasting, chemical means employing a sulfate solution, or means of spraying a combustion gas flame, for example. In this case, however, the mold surfaces are damaged, corner portions of the mold surfaces are insufficiently cleaned, or the cleaning operation requires a long time, for example.

SUMMARY OF THE INVENTION

An object of the present invention is to provide a resin sealing and molding apparatus for electronic parts, that is formed by detachably connecting a plurality of resin sealing and molding parts to an apparatus body, which achieves an effect of reducing a molding cost by employing of a material supply mechanism and a molding transfer mechanism, which includes a cleaning mechanism for removing mold surface contaminants that achieves a cleaning effect of removing resin flashes and effectively and reliably removing the mold surface contaminants adhering to or accumulating on mold surfaces in the respective resin sealing and molding parts, and which can automatically control all working steps including a step of cleaning the mold surface contaminants.

In order to solve the aforementioned technical problems, the resin sealing and molding apparatus for electronic parts according to the present invention is formed by a resin sealing and molding apparatus body comprising a resin sealing and molding part for sealing and molding electronic parts such as semiconductor chips with a resin material, and a connector consisting of a resin sealing and molding apparatus comprising at least a resin sealing and molding part detachably mounted on the body, and this apparatus comprises a UV (ultraviolet) application mechanism for cleaning a mold surface of a mold in each resin sealing and molding part, while this cleaning UV application mechanism is mounted to be freely reciprocative between a retracted position in which the mechanism does not inhibit or interfere with; a material supply operation for each resin sealing and molding part and a molding extracting operation, and a deployed position close to the mold surfaces of the mold in each resin sealing and molding part.

According to the present invention, it is possible to reliably remove mold surface contaminants by irradiating the mold surfaces of the mold in each resin sealing and molding part with UV for decomposing the mold surface contaminants adhering to or accumulating on the mold surfaces and thereby separating and scattering the same.

Further, the resin sealing and molding apparatus for electronic parts according to the present invention is characterized in that the aforementioned resin sealing and molding part is provided with a suction discharge mechanism for capturing the mold surface contaminants that have been separated and scattered; from the mold surfaces of the mold in the resin sealing and molding part and forcibly suction-discharging the i.e. discharging by suction, mold surface contaminants to the exterior.

Thus, it is possible to capture the mold surface contaminants that have been decomposed by irradiation with UV and separated and scattered from the mold surfaces of the mold, and to forcibly suction-discharge the same to the exterior by employing the suction discharge mechanism.

Further, the resin sealing and molding apparatus for electronic parts according to the present invention is characterized in that the aforementioned cleaning UV application mechanism is provided with a suction discharge mechanism for capturing the mold surface contaminants separated and scattered from the mold surfaces of the mold in the resin sealing and molding part and forcibly suction-discharging the mold surface contaminants to the exterior.

Further, the resin sealing and molding apparatus for electronic parts according to the present invention is characterized in that each of the aforementioned resin sealing and molding part and the cleaning UV application mechanism is provided with a suction discharge mechanism for capturing the mold surface contaminants separated and scattered from the mold surfaces of the mold in the resin sealing and molding part and forcibly suction-discharging the mold surface contaminants to the exterior.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
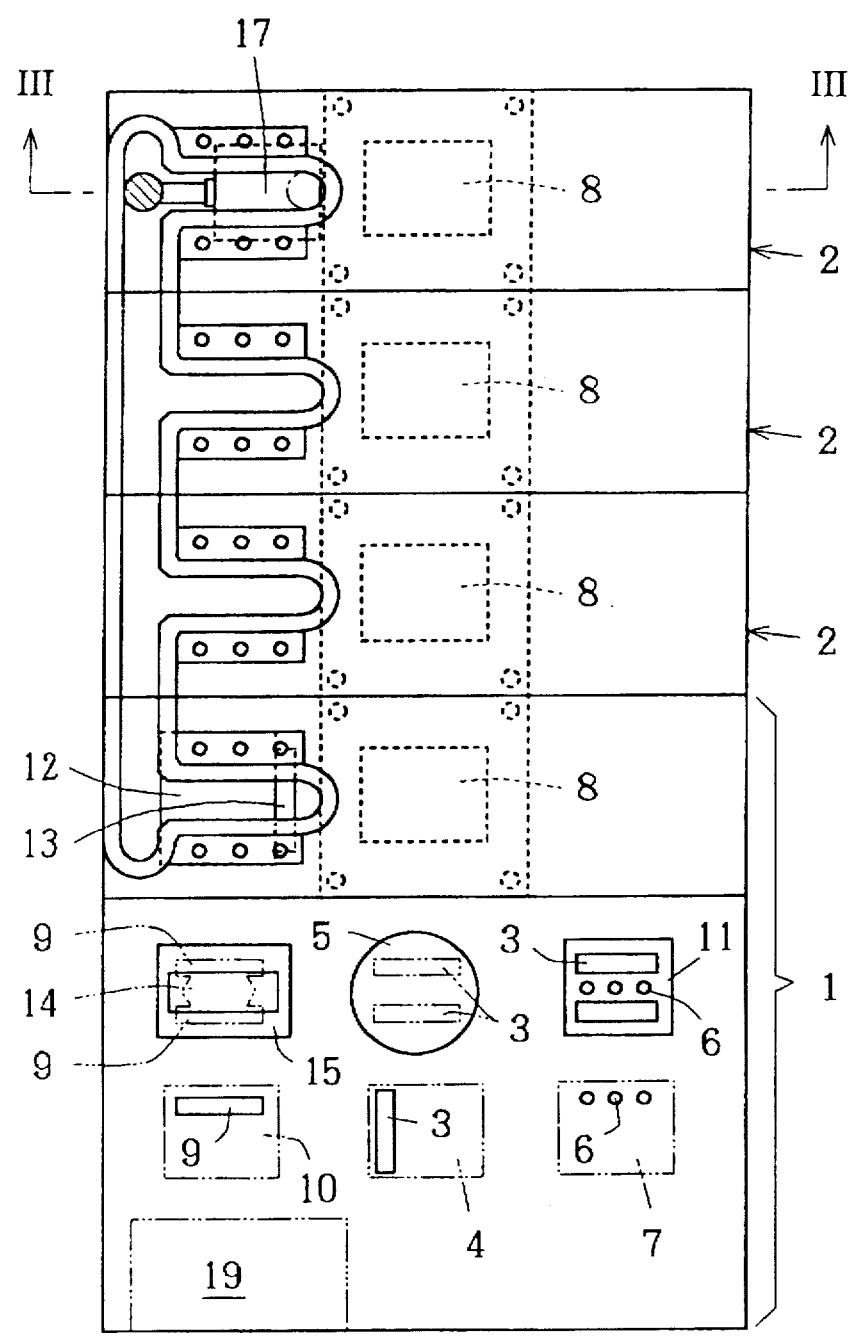
FIG. 1 is a partially fragmented schematic plan view of a resin sealing/molding apparatus for electronic parts according to an embodiment of the present invention, showing a state of connecting a plurality of connectors consisting of resin sealing and molding apparatuses comprising resin sealing and molding parts to a body of the resin sealing and molding apparatus.
Figure 2:
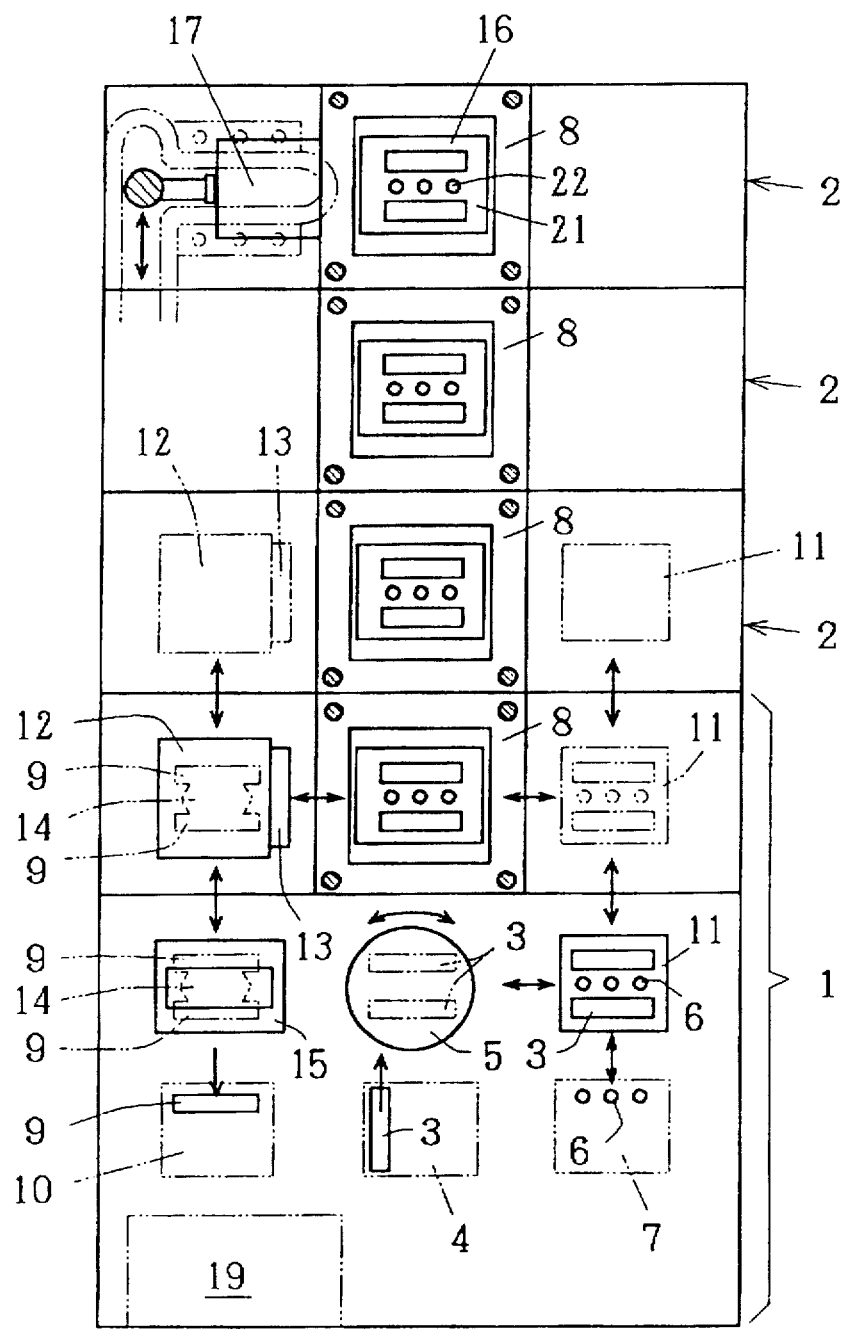
FIG. 2 is a partially fragmented schematic crosssectional plan view of the molding apparatus shown in FIG. 1.
Figure 3:
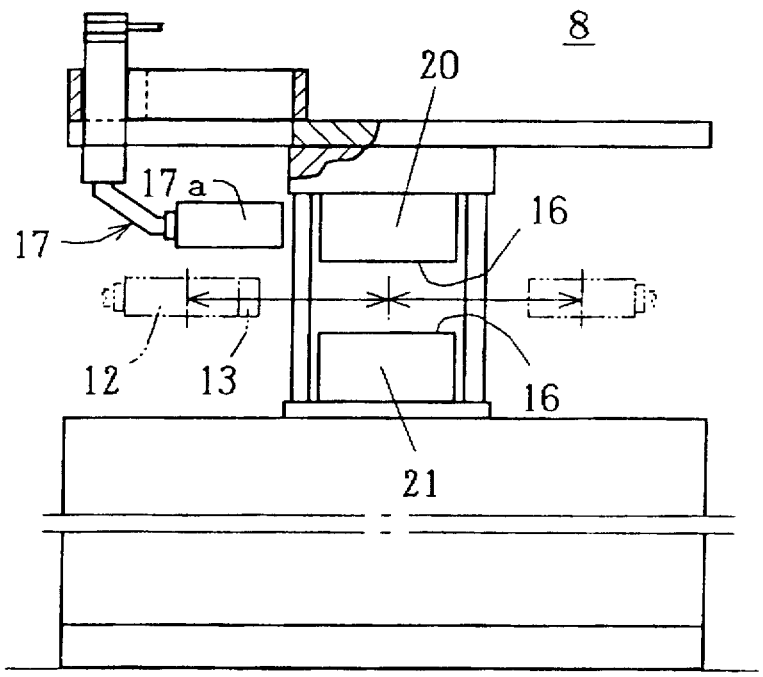
FIG. 3 is a partially fragmented schematic longitudinal sectional view of the molding apparatus taken along the line III—III in FIG. 1.

The present invention is now described in detail with reference to the drawings.

As shown in FIGS. 1 to 6, a resin sealing and molding apparatus for electronic parts according to the present invention is formed by serially and detachably mounting a plurality of connectors or connection units 2 consisting of resin sealing and molding apparatuses comprising resin sealing and molding parts on a body 1 of a resin sealing and molding apparatus (in the figures, three connectors 2 are connected to the body 1).

The apparatus body 1 comprises a material loading part 4 for loading unshaped lead frames 3, an aligning part 5 for the unshaped lead frames 3, an aligning part 7 for resin tablets 6, a resin sealing and molding part 8 for sealing and molding with a resin material the electronic parts mounted on the unshaped lead frames 3, molding storage part 10 for storing moldings (sealed lead frames 9) that have been molded in the resin sealing and molding part 8, a material supply mechanism 11 for transferring the unshaped lead frames 3 and the resin tablets 6 from the aligning parts 5 and 7 to prescribed positions of the resin sealing and molding part 8, a molding transfer mechanism 12 for transferring moldings molded in the resin sealing and molding part 8 to the molding storage part 10, a mold surface cleaning mechanism 13 which is integrated with the molding transfer mechanism 12 to reciprocate simultaneously with the same, an unnecessary resin cutting and removing part 15 for cutting/removing resin molding portions 14, that are unnecessary in the finished products and that are connected with the moldings, a cleaning UV application mechanism 17 for removing mold surface contaminants adhering to or accumulating on mold surfaces 16 of a mold for resin molding in the resin sealing and molding part 8, suction discharge mechanisms 18 for forcibly suction-discharging the mold surface contaminants that have been decomposed by irradiation with UV by the UV application mechanism 17 and that have thereby been separated and scattered; from the mold surfaces of the mold, and a control mechanism 19 for automatically controlling these parts.

A fixed upper mold section 20 and a movable lower mold section 21 for resin molding are oppositely arranged on the resin sealing and molding part 8.

The lower mold section 21 is provided with pots 22 for supplying resin tablets 6 and cavities 23 for resin molding.

Plungers are engaged in the pots 22 for pressurizing the resin tablets 6 which are supplied in these pots 22, while concave parts (not shown) are provided on the mold surface 16 sides of the lower cavities 23 for engaging and setting the unshaped lead frames 3 therein.

On the other hand, the upper mold section 20 is provided with cull parts 25 and upper cavities 26 in positions opposite to the lower pots 22 and the lower cavities 23 respectively.

The cull parts 25 and the upper cavities 26 are communicationally connected with each other through gate parts 27, whereby the cull parts 25 and the gate parts 27 define passages 24 for transferring a melted resin material.

The upper cavities 26 are communicationally connected with the exterior through proper air vents 28.

The air vents 28 are communicationally connected with a vacuum source such as an externally arranged vacuum pump through air inlet holes 29 and air inlet passages 30 provided on outer peripheral portions of the upper and lower cavities 26 and 23, as described later. Therefore, suction discharge mechanisms 18 are formed, which can forcibly suction-discharge moisture and air remaining in the material loading part 4 and the passages 24 for the melted resin material, and gases generated in molding or the like, when the vacuum source is operated while closing the upper and lower mold sections 20 and 21 for performing resin molding.

The aforementioned aligning part 5 for the unshaped lead frames 3 is provided to be capable of aligning in a prescribed direction, a plurality of unshaped lead frames 3 (two lead frames 3 in the embodiment) transferred from the material loading part 4.

On the other hand, the aforementioned aligning part 7 for the resin tablets 6 is provided to be capable of aligning the resin tablets 6 in a number (three in the embodiment) and space positions corresponding to the number of the pots 22 in the resin sealing and molding part 8 and space positions thereof.

The aforementioned material supply mechanism 11 is provided to catch or engage the plurality of unshaped lead frames 3 and the resin tablets 6 aligned on the aligning parts 5 and 7 respectively and simultaneously transfer the same to the resin sealing and molding part 8 in this state, for engaging and setting the unshaped lead frames 3 in the concave parts of the lower cavities 23 and introducing and supplying the resin tablets 6 into the pots 22 respectively.

The resin tablets 6 supplied into the pots 22 are successively heated and melted by the upper and lower mold sections 20 and 21 which are heated to a molding temperature.

Actions of supplying the unshaped lead frames 3 and the resin tablets 6 to the respective resin sealing and molding parts 8 are different only in supply positions and distances from each other, and the remaining supply actions are substantially identical to the above.

The molding transfer mechanism 12 is provided to catch or engage moldings (the sealed lead frames 9 and the unnecessary resin molding portions 14 integrally molded with the same) molded in the resin sealing and molding part 8 and to transfer the same to the unnecessary resin cutting and removing part 15.

The unnecessary resin cutting and removing part 15 is provided to be capable of transferring only the sealed lead frames 9, from which the unnecessary resin portions 14 have been removed, to the molding storage part 10 for storing the same.

The mold surface cleaning mechanism 13 is adapted to press forward ends of brush members (not shown) against the mold surfaces 16 of the upper and lower mold sections 20 and 21 and moving the same thereon following movement of the molding transfer mechanism 12, thereby separating the resin flashes adhering to the mold surfaces 16 and suction-discharging the separated resin flashes to the exterior through a proper evacuation mechanism (a suction discharge mechanism for the resin flashes).

In general, this mold surface cleaning action is performed when the molding transfer mechanism 12 catches or engages the moldings from the resin sealing and molding part 8 and transfers the same to the unnecessary resin cutting and removing part 15.

Therefore, general resin flashes are removed by the cleaning action of the mold surface cleaning mechanism 13, while this cleaning action is performed simultaneously with the molding transfer action by the molding transfer mechanism 12.

The cleaning UV application mechanism 17 is provided to be freely reciprocative between a retracted position (a position shown by solid lines in FIG. 3) not inhibiting or interfering with a material supply operation by the material supply mechanism 11 for each resin sealing and molding part 8 and a molding extracting operation by the molding transfer mechanism 12, and a deployed or operating position (a position shown by chain lines in FIG. 4) close to the mold surfaces 16 of the upper and lower mold sections 20 and 21 in each resin sealing and molding part 8.

Figure 4:
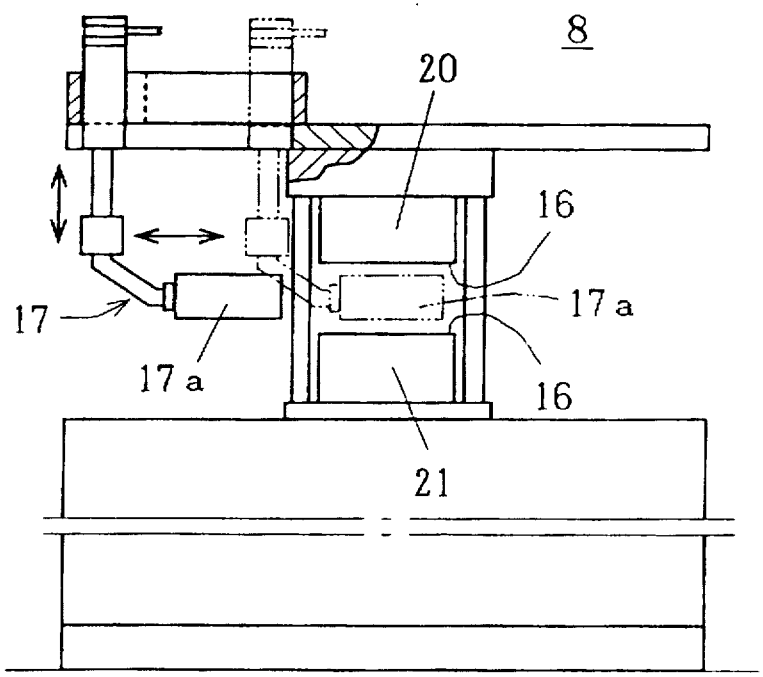
FIG. 4 is a partially fragmented schematic longitudinal sectional view of the molding apparatus corresponding to FIG. 3.

Namely, this cleaning UV application mechanism 17 is employed in case of cleaning the mold surfaces 16 of the upper and lower mold sections 20 and 21 in any resin sealing and molding part 8 that has stopped its resin sealing and molding; operation, and is moved and retracted to the retracted position not inhibiting the operations when ordinary resin sealing and molding operations are carried out in all resin sealing and molding parts 8. The cleaning UV application mechanism 17 is periodically inserted between the mold surfaces 16 of the upper and lower mold sections 20 and 21 in the resin sealing and molding part 8 as shown in FIGS. 4 and 5, during every molding cycle, in an operation exchange time or a stop time of the molding apparatus, otherwise as needed.

Further, the cleaning UV application mechanism 17 is provided to be freely reciprocative between the retracted position and the deployed position close to the mold surfaces 16 of the upper and lower mold sections 20 and 21 in each resin sealing and molding part 8 similarly to the automatic control for the aforementioned material supply mechanism 11 and the molding transfer mechanism 12, whereby the mold surface cleaning action with the UV application mechanism 17 can be automatically performed.

Figure 5:
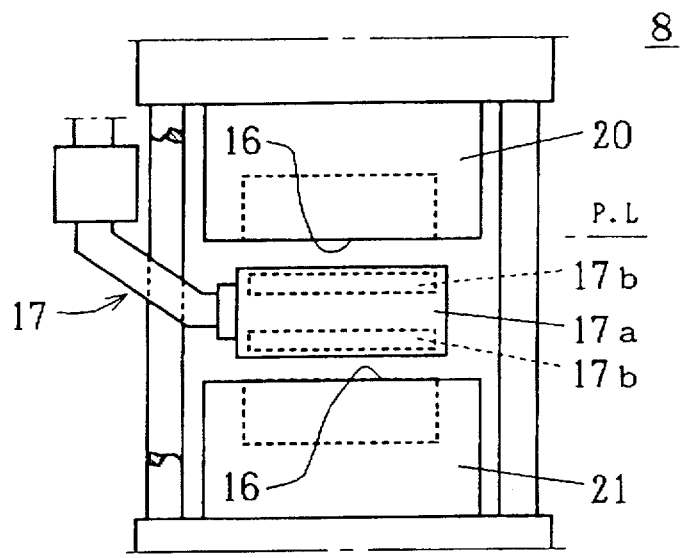
FIG. 5 is a partially fragmented enlarged side elevational view of a principal part of a resin sealing and molding part of the molding apparatus shown in FIG. 1, showing a state of inserting a cleaning UV application mechanism between opened mold sections.
Figure 6:
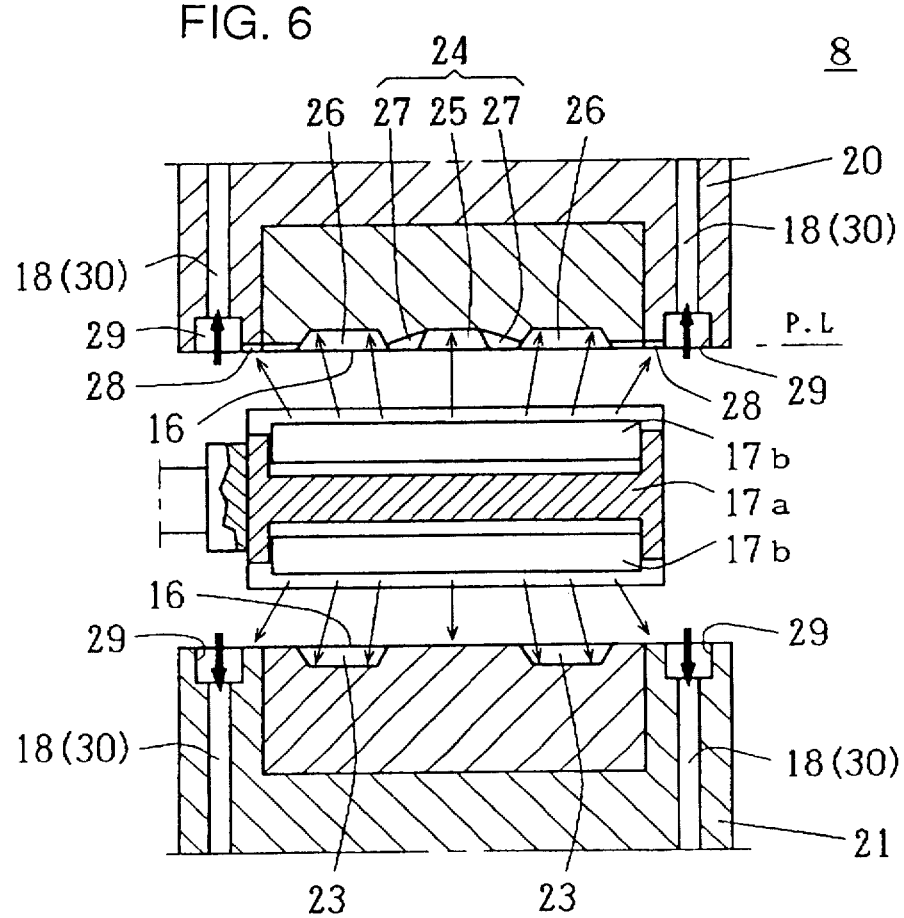
FIG. 6 is a partially fragmented enlarged longitudinal sectional view showing a principal part of the resin sealing and molding part shown in FIG. 5.

A body 17a of the cleaning UV application mechanism 17 comprises lamps (mercury lamps) 17b for UV application as shown in FIGS. 5 and 6, whereby the mold surfaces 16 of the upper and lower mold sections 20 and 21 can be irradiated with UV by the UV application lamps 17b from positions close to the mold surfaces 16.

In the body 17a of the UV application mechanism 17 shown in FIG. 6, the UV application lamps 17b are arranged on upper and lower surfaces to be capable of simultaneously irradiating the mold surfaces 16 of the upper and lower mold sections 20 and 21 with UV.

Figure 7:
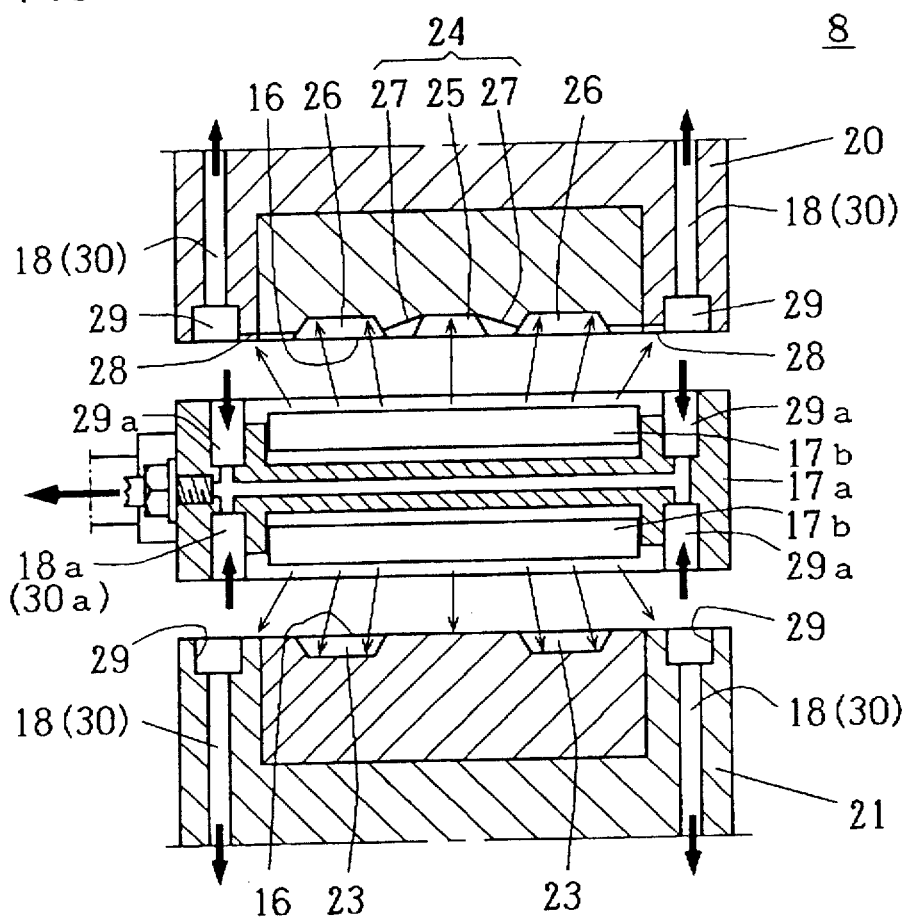
FIG. 7 is a partially fragmented longitudinal sectional view showing a principal part of a resin sealing and molding part according to another embodiment of the present invention.

On the other hand, a body 17a of a UV application mechanism shown in FIG. 7 is provided with a suction discharge mechanism 18a for mold surface contaminants, which is adapted to capture mold surface contaminants that have been separated and scattered from the mold surfaces 16 as described later and to forcibly suction-discharge the same to the exterior, in addition to the structure shown in FIG. 6.

The aforementioned suction discharge mechanisms 18 and 18a for mold surface contaminants are structured as follows.

As shown in each of FIGS. 6 and 7, the suction discharge mechanisms 18 provided on the upper and lower mold sections 20 and 21 are formed by the air inlet holes 29 provided on the outer peripheral portions of the upper and lower cavities 26 and 23, the vacuum source (not shown) such as an externally arranged vacuum pump, and the proper air inlet passages 30 communicationally connecting the inlet holes 29 with the vacuum source.

As shown in FIG. 7, on the other hand, the suction discharge mechanism 18a for mold surface contaminants provided on the body 17a of the UV application mechanism is formed by air inlet holes 29a arranged on outer peripheral portions of UV application lamps 17b in positions substantially corresponding to the positions of the air inlet holes 29 in the aforementioned upper and lower mold sections 20 and 21, a vacuum source (not shown) such as an externally arranged vacuum pump, exterior, and proper suction passages 30a communicationally connecting the air inlet holes 29a with the vacuum source.

When the vacuum source is operated, therefore, air around the mold surfaces 16 of the upper and lower mold sections 20 and 21 can be discharged to the exterior through the air inlet holes 29a and the inlet passages 30a.

As described later, the suction discharge mechanisms 18 and 18a for mold surface contaminants may be provided in order to more reliably and quickly remove the mold surface contaminants, and hence the same are not inevitably necessary structures.

Further, at least either or both of the suction discharge mechanisms 18 and 18a for mold surface contaminants may be employed.

If each resin sealing and molding part 8 is provided with a proper evacuation mechanism for suction-removing resin flashes separated from the mold surfaces 16 to the exterior, this evacuation mechanism can also be employed as a suction discharger for the aforementioned mold surface contaminants.

An operation of sealing and molding electronic parts with resin by the aforementioned apparatus is now described.

First, the upper and lower mold sections 20 and 21 are opened.

Then, the unshaped lead frames 3 and the resin tablets 6 are simultaneously transferred from the aligning parts 5 and 7 to the resin sealing and molding part 8 by the material supply mechanism 11, so that the unshaped lead frames 3 are engaged and set in the concave parts of the lower cavities 23 and the resin tablets 6 are introduced or supplied into the pots 22 respectively. At this time, the resin tablets 6 are successively heated and melted in the respective pots 22.

Then, the lower mold section 21 is upwardly moved for closing the upper and lower mold sections 20 and 21.

Then, the resin tablets 6 are pressurized by the respective plungers in the pots 22 to be heated and melted, while the melted resin material is injected or charged into the upper and lower cavities 23 and 26 through the passages 24, for sealing and molding the electronic parts on the lead frames 3, which have been set in the upper and lower cavities 23 and 26, with the resin.

After the electronic parts are sealed and molded with resin, the lower mold section 21 is downwardly moved for opening the upper and lower mold sections 20 and 21.

Then, the sealed lead frames 9 and the unnecessary resin portions 14 are released simultaneously with the mold opening step.

Then, the sealed lead frames 9 and the unnecessary resin portions 14 are transferred to the unnecessary resin cutting and removing part 15 by the molding transfer mechanism 12, for cutting and removing the unnecessary resin portions 14. At this time, the mold surfaces 16 are cleaned by the mold surface cleaning mechanism 13 when the molding transfer mechanism 12 is moved toward the unnecessary resin cutting and removing part 15, since the mold surface cleaning mechanism 13 is integrated with the molding transfer mechanism 12. Therefore, resin flashes adhering to the mold surfaces 16 are suction-removed to the exterior through this cleaning action and the aforementioned evacuation (see FIGS. 6 and 7).

Then, the moldings (the sealed lead frames 9) from which the unnecessary resin portions 14 have bee removed are transferred to and stored in the molding storage part 10 by the molding transfer mechanism 12.

A mold surface cleaning action of removing mold surface contaminants 32 adhering to or accumulating on the mold surfaces 16 with the cleaning UV application mechanism 17 is now described.

The mold surface cleaning operation employing the UV application mechanism 17 is performed by periodically inserting the body 17a of the cleaning UV application mechanism 17 between the mold surfaces 16 of the upper and lower mold sections 20 and 21 in the resin sealing and molding part 8 under control of the control mechanism 19 in a stop time of the molding apparatus, or as needed, as described above.

Figure 8:
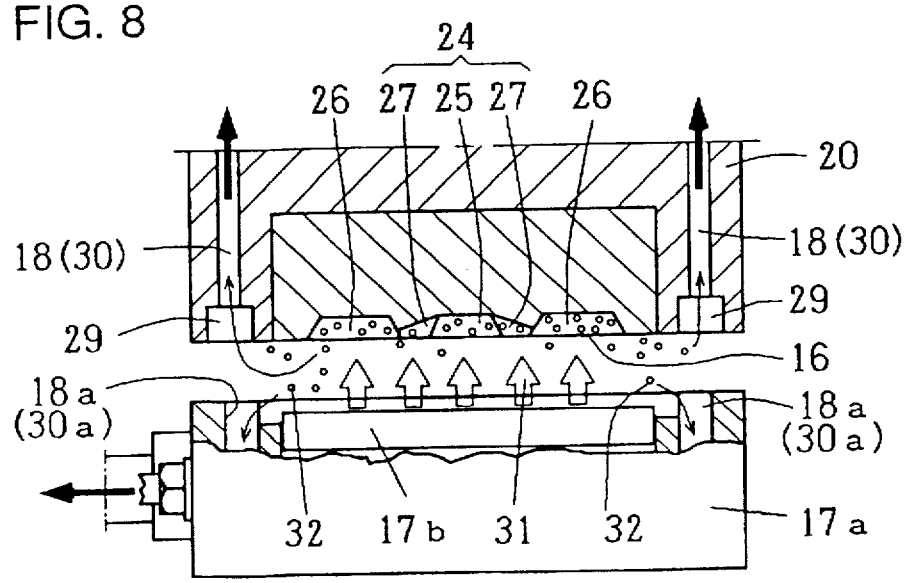
FIG. 8 is an explanatory diagram for explaining a cleaning action achieved by a cleaning UV application mechanism.

When the mold surfaces 16 are irradiated with UV radiation 31 by the UV application lamps 17b provided on the body 17a of the UV application mechanism 17 from positions close to the mold surfaces 16 of the upper and lower mold sections 20 and 21, the mold surface contaminants 32, consisting of a mold release agent contained in the resin material or volatile gas generated by heating, and adhering to or accumulating on the mold surfaces 16, are decomposed and separated or scattered from the mold surfaces 16, as shown in FIG. 8.

Namely, it is possible to decompose the mold surface contaminants 32 adhering to or accumulating on the mold surfaces 16 and to separate or scatter the same from the mold surfaces 16 by irradiating the mold surfaces 16 with the UV radiation 31, whereby the mold surfaces 16 can be efficiently and reliably cleaned by irradiating the same with the UV radiation 31 for a required time (30 minutes, for example).

It is possible to reliably capture the mold surface contaminants 32 that have been separated or scattered from the mold surfaces 16 and to forcibly discharge the same by suction to the exterior by also employing proper evacuation mechanisms provided on each resin sealing and molding part 8 for suction-removing the resin flashes and the aforementioned suction discharge mechanisms 18 and/or 18a for the mold surface contaminants. Thus, the mold surface contaminants 32 can advantageously be reliably treated and removed.

In the aforementioned structure, it is not necessary to detach the mold from the apparatus body 1 for the purpose of the cleaning operation of removing the mold surface contaminants 32, whereby the mold surfaces 16 of the mold which is in a heated state immediately after resin portion can be immediately irradiated with the UV radiation 31, for example.

In this case, therefore, it is possible to facilitate the decomposing action of the mold surface contaminants 32 on the mold which is in a heated state, whereby the cleaning operation for removing the mold surface contaminants 32 can be more efficiently and quickly performed.

The present invention is not restricted to the aforementioned embodiments, but can be arbitrarily and appropriately changed or selected as needed within the scope of the invention.

For example, a dedicated transfer mechanism (not shown) for transferring only the sealed lead frames 9 from which the unnecessary resin portions 14 have been removed to the molding storage part 10 for storing the same may be provided independently of the molding transfer mechanism 12.

While the suction discharge mechanisms 18 for the mold surface contaminants 32 are integrally provided with the resin sealing and molding part 8, the same may alternatively be provided independently of the resin sealing and molding part 8.

According to each of the embodiments of the present invention, as hereinabove described, the present apparatus not only maintains the action or effect of reducing the molding cost by employment of the material supply mechanism and the molding transfer mechanism, and the mold surface cleaning action or effect of removing resin flashes, but also efficiently and reliably performs; but the mold surface cleaning operation of decomposing the mold surface contaminants adhering to or accumulating on the mold surfaces in each resin sealing and molding part and separating or scattering the same from the mold surfaces. Further, it is possible to provide a resin sealing and molding apparatus for electronic parts which can automatically control all working steps including the cleaning operation for the mold surface contaminants.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A resin portion apparatus for sealing an electronic part with a resin material, said apparatus comprising an apparatus body, at least one molding unit that is detachably mounted on said apparatus body, that includes at least one mold having a mold surface, and being adapted to have the electronic part supplied into said mold before a molding operation of sealing the electronic part with the resin material in said mold and to have the electronic part removed from said mold after the molding operation, and a UV application mechanism arranged to direct UV radiation at said mold surface for cleaning contaminants from said mold surface, wherein said UV application mechanism is mounted so as to be freely reciprocative between a retracted position in which said UV application mechanism does not interfere with a supply operation of supplying the electronic part into said mold and a removal operation of removing the electronic part from said mold, and a deployed position close to said mold surface of said mold.

2. The resin portion apparatus in accordance with claims 1, wherein said at least one molding unit further respectively includes a suction discharge mechanism arranged and adapted to suck away the contaminants that have been cleaned from said mold surface of said mold by said UV application mechanism.

3. The resin portion apparatus in accordance with claim 2, wherein said suction discharge mechanism includes an air inlet hole provided through said mold on an outer peripheral portion of said molding unit, a vacuum source arranged outside of said mold, and an inlet passage communicationally connecting said air inlet hole with said vacuum source.

4. The resin portion apparatus in accordance with claim 1, wherein said UV application mechanism comprises a UV source that emits said UV radiation and a suction discharge mechanism arranged and adapted to suck away the contaminants that have been cleaned from said mold surface of said mold by said UV radiation which is emitted from said UV source.

5. The resin portion apparatus in accordance with claim 4, wherein said UV application mechanism further comprises a UV mechanism body, said UV source comprises a UV application lamp mounted on said UV mechanism body, and said suction discharge mechanism includes an air inlet hole provided through said UV mechanism body on an outer peripheral portion thereof peripherally outward of said UV application lamp, a vacuum source arranged outside of said mold, and an inlet passage communicationally connecting said air inlet hole with said vacuum source.

6. The resin portion apparatus in accordance with claim 1, wherein said UV application mechanism comprises a UV source that emits said UV radiation and a first suction discharge mechanism arranged and adapted to suck away the contaminants that have been cleaned from said mold surface of said mold by said UV radiation which is emitted from said UV source, and said at least one molding unit further respectively includes a second suction discharge mechanism arranged and adapted to suck away the contaminants that have been cleaned from said mold surface of said mold by said UV radiation which is emitted from said UV source.

7. The resin portion apparatus in accordance with claim 6, wherein said UV application mechanism further comprises a UV mechanism body, said UV source comprises a UV application lamp mounted on said UV mechanism body, said first suction discharge mechanism includes a first air inlet hole provided through said UV mechanism body on an outer peripheral portion thereof peripherally outward of said UV application lamp, said second suction discharge mechanism includes a second air inlet hole provided through said mold on an outer peripheral portion of said molding unit, and said first and second suction discharge mechanisms together include a vacuum source arranged outside of said mold and at least one inlet passage communicationally connecting said first and second air inlet holes with said vacuum source.

8. The resin portion apparatus in accordance with claim 7, wherein said first air inlet hole is provided through said UV mechanism body in a position substantially corresponding to a position of said second air inlet hole through said mold.

9. The resin portion apparatus in accordance with claim 1, comprising a plurality of said at least one molding unit detachably mounted on only one of said apparatus body, and having only one of said UV application mechanism mounted movably relative to said apparatus body to selectively direct said UV radiation at said mold surface of a respective selected one of said plural molding units.

10. The resin portion apparatus in accordance with claim 1, further comprising a supply mechanism arranged movably relative to said apparatus body and said at least one molding unit and adapted to supply the electronic part into said mold before the molding operation, and a transfer mechanism arranged movably relative to said apparatus body and said at least one molding unit and adapted to remove the electronic part from said mold after the molding operation, wherein said UV application mechanism is movably arranged relative to said mold so that said UV application mechanism is adjacent said mold surface in said deployed position and is clear of movements of said supply mechanism and of said transfer mechanism in said retracted position.

11. The resin portion apparatus in accordance with claim 1, wherein said mold includes an upper mold member and a lower mold member adapted to form a mold cavity therebetween and to mate along a parting plane, said mold surface includes an upper surface of said mold cavity in said upper mold member and a lower surface of said mold cavity in said lower mold member, said UV application mechanism includes an upper UV source adapted to direct UV radiation at said upper surface and a lower UV source adapted to direct UV radiation at said lower surface, and said UV application mechanism reaches into said mold cavity between said upper and lower mold members along said parting plane in said deployed position.

12. The resin portion apparatus in accordance with claim 1, wherein said UV application mechanism comprises at least one mercury lamp.

13. The resin portion apparatus in accordance with claim 1, wherein said UV application mechanism comprises a UV radiation source having a radiation intensity adequate to decompose the contaminants and remove the contaminants from said mold surface.

14. The resin portion apparatus in accordance with claim 1, wherein said UV radiation source is adapted to decompose and remove from said mold surface the contaminants which comprise mold release agents.

15. The resin portion apparatus in accordance with claim 1, further comprising a cleaning brush device that is movably arranged relative to said mold and that includes brush bristles arranged and adapted to contact and move over said mold surface so as to remove resin flash from said mold surface.

* * * * *

UNITED STATES PATENT AND TRADEMARK OFFICE
CERTIFICATE OF CORRECTION

PATENT NO. : 5,783,220
DATED : July 21, 1998
INVENTOR(S) : Osada et al.

It is certified that error appears in the above-identified patent and that said Letters Patent is hereby corrected as shown below:

Col. 2, line 29, after "simultaneously" replace "product" by --produce--.

Col. 4, line 41, after "resin" replace "sealing/molding" by --sealing and molding--.

Col. 5, line 22, after "frames 3," insert --a--;
       line 33, after "for" replace "cutting/" by --cutting and--.

Col. 7, line 15, after "molding" delete ";";
       line 24, after "apparatus," insert --or--.

Col. 10, line 10, after "performs" delete ": but";
       line 49, replace "claims" by --claim--.

Signed and Sealed this

Twenty-ninth Day of September, 1998

Attest:

BRUCE LEHMAN

*Attesting Officer*       *Commissioner of Patents and Trademarks*